United States Patent
Salif et al.

(10) Patent No.: US 12,497,006 B2
(45) Date of Patent: Dec. 16, 2025

(54) ROBUST ACTUATOR CONTROL METHODS FOR HEAVY-DUTY VEHICLE MOTION MANAGEMENT

(71) Applicant: VOLVO TRUCK CORPORATION, Gothenburg (SE)

(72) Inventors: Ramadan Salif, Gothenburg (SE); Mats Rydström, Billdal (SE); Johan Lindberg, Gothenburg (SE); Leo Laine, Härryda (SE); Leon Henderson, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 14 days.

(21) Appl. No.: 18/721,406

(22) PCT Filed: Dec. 20, 2021

(86) PCT No.: PCT/EP2021/086795
§ 371 (c)(1),
(2) Date: Jun. 18, 2024

(87) PCT Pub. No.: WO2023/117035
PCT Pub. Date: Jun. 29, 2023

(65) Prior Publication Data
US 2025/0050851 A1 Feb. 13, 2025

(51) Int. Cl.
*B60T 8/1761* (2006.01)

(52) U.S. Cl.
CPC ......... *B60T 8/1761* (2013.01); *B60T 2240/02* (2013.01)

(58) Field of Classification Search
CPC .. B60T 8/1761; B60T 2240/02; B60T 8/1708; B60T 8/17616; B60Y 2400/81
See application file for complete search history.

(56) References Cited

U.S. PATENT DOCUMENTS

| 2015/0175009 A1* | 6/2015 | Beever | B60K 7/0007 701/22 |
| 2019/0176784 A1* | 6/2019 | Laine | B60T 8/172 |

(Continued)

FOREIGN PATENT DOCUMENTS

| DE | 102017211436 A1 | 1/2019 |
| EP | 3851346 A1 | 7/2021 |

(Continued)

OTHER PUBLICATIONS

International Search Report and Written Opinion of the International Searching Authority in corresponding International Application No. PCT/EP2021/086795 mailed Jun. 27, 2022 (8 pages).

*Primary Examiner* — Xiao En Mo
(74) *Attorney, Agent, or Firm* — Jeffri A. Kaminski; Venable LLP

(57) ABSTRACT

A control unit for controlling at least one torque generating MSD on a heavy-duty vehicle. The control unit receives a motion request indicative of a desired positive longitudinal tire force to be generated by the torque generating MSD, obtains an estimated applied torque indicative of a current torque generated by the torque generating MSD, determines a target wheel speed based on the motion request and on the estimated applied torque, and configures the torque generating MSD to maintain the target wheel speed. The control unit is arranged to decrease the target wheel speed in case an increase in configured wheel speed results in a decrease in the estimated applied torque.

16 Claims, 5 Drawing Sheets

(56) References Cited

U.S. PATENT DOCUMENTS

| | | |
|---|---|---|
| 2019/0344796 A1 | 11/2019 | Lian et al. |
| 2020/0247244 A1 | 8/2020 | Yamane et al. |
| 2021/0046827 A1 | 2/2021 | Greenwood et al. |
| 2021/0078581 A1 | 3/2021 | Velazquez Alcantar et al. |

FOREIGN PATENT DOCUMENTS

| | | |
|---|---|---|
| WO | 2021144009 A1 | 7/2021 |
| WO | 2021144010 A1 | 7/2021 |
| WO | 2021144065 A1 | 7/2021 |
| WO | 21214169 A1 | 10/2021 |

\* cited by examiner

ROBUST ACTUATOR CONTROL METHODS FOR HEAVY-DUTY VEHICLE MOTION MANAGEMENT

CROSS-REFERENCE TO RELATED APPLICATIONS

This application is a U.S. National Stage application of PCT/EP2021/086795, filed Dec. 20, 2021 and published on Jun. 29, 2023, as WO 2023/117035, all of which is hereby incorporated by reference in its entirety.

TECHNICAL FIELD

The present disclosure relates to vehicle motion management for electrically powered heavy-duty vehicles, i.e., coordinated control of electric machines and other motion support devices such as service brakes and steering.

The invention can be applied with advantage in heavy-duty vehicles such as trucks, buses, and construction machines.

BACKGROUND

Vehicles are becoming ever more complex in terms of mechanics, pneumatics, hydraulics, electronics, and software. A modern heavy-duty vehicle may comprise a wide range of different torque generating physical devices, such as a combustion engine, one or more electric machines, friction brakes, and electromagnetic brakes. These physical devices are commonly known as torque generating motion support devices (MSD) and may be controlled by respective MSD control units which are often arranged in direct connection to the MSD actuator. The local MSD control units are normally connected to a central vehicle controller that is configured to perform overall vehicle motion management VMM by coordinating the different MSDs to obtain a desired motion by the vehicle.

The interface between the central VMM controller and the torque-generating MSDs has, traditionally, been based on torque requests determined by the central VMM control unit and sent to the local MSD control units over a torque-based interface. However, the interface between central and local controllers is normally of limited bandwidth and may be associated with significant latency, which hampers the efficiency of the vehicle motion management in countering abrupt and unexpected changes in operating conditions.

Significant improvements in responsiveness can be achieved by instead using wheel speed or wheel slip-based requests on the interface between the central controller and the local controllers, as discussed in WO2021144010A1. This type of control can overcome the interface bandwidth issues but relies on that a relationship between generated tyre force and wheel slip at the wheels of the heavy-duty vehicle is at least approximately known, which may not always be the case, e.g., if the road surface conditions are unknown, or if one or more important vehicle properties such as cargo weight is unknown.

SUMMARY

It is an object of the present disclosure to provide wheel slip-based control methods which are able to function even if very little is known about the current relationship between wheel slip and tyre force. It is a further object of the present disclosure to provide wheel slip-based control methods which do not require accurate data on vehicle speed over ground.

This object is at least in part obtained by a control unit for controlling at least one torque generating MSD on a heavy-duty vehicle. The control unit is arranged to receive a motion request $T_i$ indicative of a desired positive longitudinal tyre force $F_x$ to be generated by the torque generating MSD and also to obtain an estimated applied torque $T_{EST}$ indicative of a current positive torque generated by the at least one torque generating MSD. The control unit is furthermore arranged to determine a target wheel speed $\omega_i$ based on the motion request $T_i$ and on the estimated applied torque $T_{EST}$, as well as to configure the torque generating MSD to maintain the target wheel speed $\omega_i$, wherein the control unit is arranged to execute a back-off procedure comprising a decrease of the target wheel speed $\omega_i$ in case an increase in the configured wheel speed $\omega_i$ resulted in a corresponding decrease in the estimated applied torque $T_{EST}$.

This way the control unit is able to detect when the peak tyre force has been passed, and the tyre has entered into a region of the inverse tyre model where further increase in wheel speed will result in a decreased wheel force. The operation does not require explicit knowledge of any inverse tyre model or the like, nor accurate information about vehicle speed over ground. The herein proposed techniques are applicable on their own, or as back-up method for an inverse tyre model based control method for heavy-duty vehicle motion management.

The techniques disclosed herein are also appliable in the case of braking, i.e., in case negative torque is requested to decelerate the heavy-duty vehicle.

According to aspects, the at least one MSD comprises an electric machine, wherein the estimated applied torque is at least in part based on a motor current associated with the electric machine. This type of torque estimation is particularly fast, being based on electrical measurement rather than mechanical sensors. However, the estimated applied torque may of course also at least in part be based on an output from a torque sensor, such as a strain-force sensor. According to a preferred embodiment, the at least one MSD comprises a wheel hub electric machine comprising an integrated electronic control unit (ECU) arranged to output a signal comprising the estimated applied torque.

The control unit is optionally arranged to determine a relationship between the target wheel speed and the torque generated by the torque generating MSD based on a sequence of estimated applied torques and corresponding configured wheel speeds. This relationship can be output to a central controller or some other entity which can make use of the information in optimizing vehicle control. For instance, the control unit can be arranged to output data indicative of the determined model as a capability signal to a higher layer control function in a layered heavy-duty vehicle control architecture.

According to some further aspects, the estimated applied torque is compensated by the control unit for one or more predetermined wheel and/or driveline properties, such as a predetermined or estimated inertia value and/or stiffness value. This provides a more accurate estimate of the applied torque, especially during dynamic transient behaviors. The estimated applied torque may furthermore be determined at least in part based on a predetermined electric machine wind-up characteristic, thus improving the estimated torque even further.

According to other aspects, the control unit is arranged to vary the target wheel speed around a nominal target wheel speed value and to monitor the estimated applied torque in dependence of the variation in target wheel speed. This allows the control unit to probe the underlying relationship between wheel force and wheel slip (or wheel speed) in order to get an idea about the location of the peak of the wheel force curve.

The control unit may furthermore be arranged to set a current torque generating capability as the estimated applied torque in case an increase in configured wheel speed results in a decrease in the estimated applied torque. This current torque generating capability may be used by, e.g., higher layer control functions in controlling the heavy-duty vehicle more accurately.

According to some additional aspects, the control unit is arranged to increase a configured control bandwidth of an MSD actuator in case an increase in configured wheel speed results in a decrease in the estimated applied torque. The increase in configured control bandwidth improves the responsiveness of the MSD, which is an advantage if the operating point of the tyre is about to transition from its linear region and into the non-linear region.

There is also disclosed herein computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
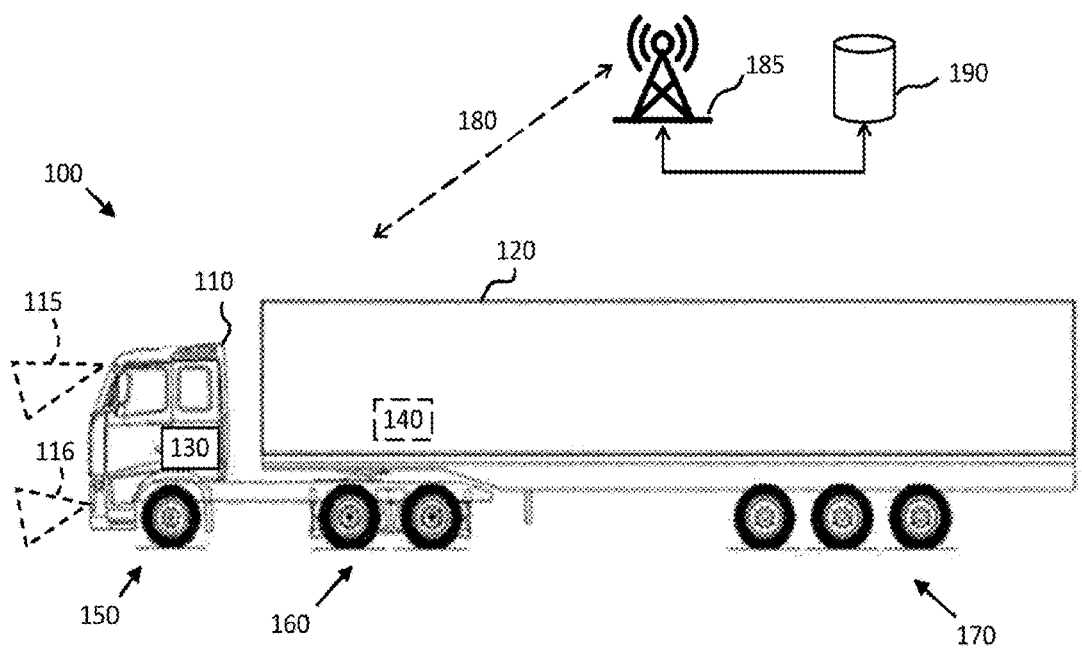
FIG. 1 shows an example heavy-duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a tractor or towing vehicle 110 supported on front wheels 150 and rear wheels 160, at least some of which are driven wheels. Normally but not necessarily, all the wheels on the tractor are braked wheels. The tractor 110 is configured to tow a first trailer unit 120 supported on trailer wheels 170 by a fifth wheel connection in a known manner. The trailer wheels are normally braked wheels but may also comprise driven wheels on one or more axles.

It is appreciated that the herein disclosed methods and control units can be applied with advantage also in other types of heavy-duty vehicles, such as rigid trucks, trucks with drawbar connections, construction equipment, buses, and the like.

The tractor 110 comprises a vehicle unit computer (VUC) 130 for controlling various kinds of functionality, i.a. to achieve propulsion, braking, and steering. Some trailer units 120 also comprise a VUC 140 for controlling various functions of the trailer, such as braking of trailer wheels, and sometimes also trailer wheel propulsion. The VUCs 130, 140 may be centralized or distributed over several processing circuits. Parts of the vehicle control functions may also be executed remotely, e.g., on a remote server 190 connected to the vehicle 100 via wireless link 180 and a wireless access network 185.

One or more sensor devices 115, 116 mounted on the vehicle 100 are arranged to provide input data to the VUCs. These sensor devices can be used for vehicle environment estimation, i.e., to obtain information regarding the surrounding environment in which the vehicle 100 is operating. The one or more sensor devices can be used to determine a speed $v_x$ of the vehicle and/or of one of the wheels relative to the road surface. The information from the sensors 115, 116 may also comprise data related to the geometry of the road ahead of the vehicle, the nature of the road surface, the temperature, the wind conditions, and so on.

The VUC 130 on the tractor 110 and possibly also the VUC 140 on the trailer 120 may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer.

Figure 2:
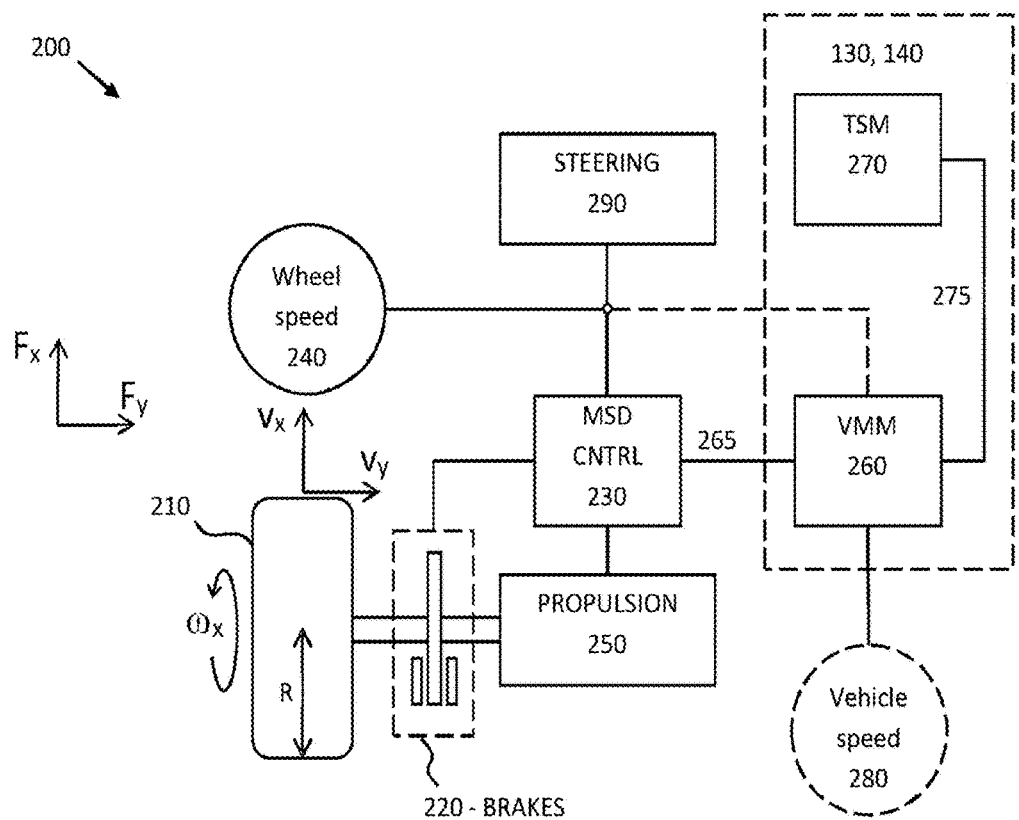
FIG. 2 schematically illustrates a motion support device control arrangement.

FIG. 2 schematically illustrates functionality 200 for controlling a wheel 210 by some example MSDs here comprising a friction brake 220 such as a disc brake or a drum brake, means for steering 290 such as a power steering arrangement, and a propulsion device 250. One or more propulsion devices may be used to power the vehicle 100. For instance, a central propulsion device can be connected to the wheels of a driven axle via a differential. Separate electric machines can also be connected to some of the wheels of the vehicle. These separate electric machines provide an increased actuator control freedom since they can be controlled independently of each other.

The friction brake 220 and the propulsion device are examples of wheel torque generating devices, which may also be referred to as actuators and which can be controlled by one or more motion support device control units 230. The control is based on, e.g., measurement data obtained from a wheel speed sensor 240 and from other vehicle state sensors, such as radar sensors, lidar sensors, and also vision based sensors such as camera sensors and infra-red detectors. Part of the control is optionally based on a vehicle speed over ground 280. However, an advantage of the techniques disclosed herein is that this information is not strictly necessary.

Other example torque generating motion support devices which may be controlled according to the principles discussed herein comprise engine retarders and power steering devices. An MSD control unit 230 may be arranged to control one or more actuators. For instance, it is not uncommon that an MSD control unit 230 is arranged to control both wheels on an axle.

The TSM function 270 plans driving operation with a time horizon of, e.g., 10 seconds or so. This period corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests 275 the desired acceleration profiles $a_{req}$ and curvature profiles $c_{req}$ from the VMM function 260 which performs force allocation to meet the requests from the TSM in a safe and robust manner. The VMM function 260 continuously feeds back capability information to the TSM function 270 detailing the current capability of the vehicle in terms of, e.g., forces, maximum velocities, and accelerations which can be generated.

Acceleration profiles and curvature profiles may of course also be obtained from a human driver of the heavy-duty vehicle via normal control input devices such as a steering wheel, accelerator pedal and brake pedal. The source of said acceleration profiles and curvature profiles is not within scope of the present disclosure and will therefore not be discussed in more detail herein.

The wheel 210 has a longitudinal velocity component $v_x$ and a lateral velocity component $v_y$. There is a longitudinal tyre force $F_x$ and a lateral tyre force $F_y$. Unless explicitly stated otherwise, the tyre forces are defined in the coordinate system of the wheel, i.e., the longitudinal force is directed in the rolling plane of the wheel, while the lateral tyre force is directed normal to the rolling plane of the wheel. The wheel has a rotational velocity $\omega_x$, and a radius R.

Figure 3:
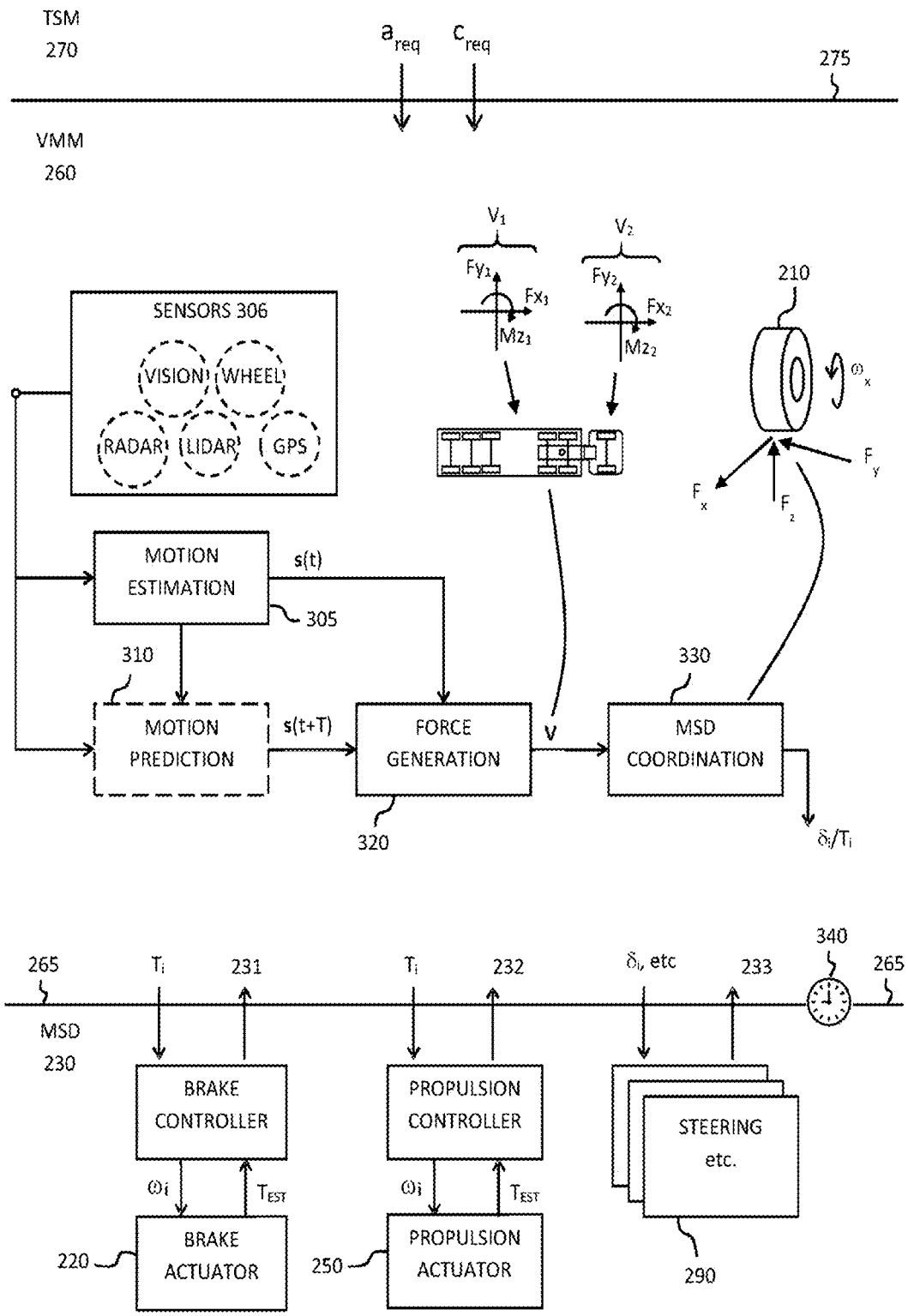
FIG. 3 illustrates a layered vehicle control function architecture.

With reference also to FIG. 3, the VMM function 260 operates with a time horizon of about 1 second or so, and continuously transforms the acceleration profiles $a_{req}$ and curvature profiles $c_{req}$ into control commands for controlling vehicle motion functions, actuated by the different MSDs 220, 250, 290 of the vehicle 100 that report back respective capabilities 231, 232, 233 to the VMM function 260, which in turn are used as constraints in the vehicle control.

The reported capabilities may, e.g., comprise an estimated current torque applied at one or more wheels, an estimated maximum torque (positive and/or negative) which can be generated in the current operating conditions, a maximum longitudinal tyre force (Fx) that can be generated, a maximum lateral force (Fy) that can be generated, and so on. The reported capabilities may also comprise status signal, such as warning messages and error messages indicating a fault.

The VMM function 260 performs vehicle state or motion estimation 305, i.e., the VMM function 260 continuously determines a current vehicle state at time t, s(t), comprising positions, speeds, accelerations and articulation angles of the different units in the vehicle combination by monitoring operations using various sensors 306 arranged on the vehicle 100, often but not always in connection to the MSDs 220, 250, 290.

The VMM function 260 optionally also performs motion prediction 310, i.e., estimates a future vehicle state s(t+T) at one or more time instants t+T in the future. Both motion estimation 305 and motion prediction 310 are generally known techniques, and several example implementations exist in the literature. These sub-functions will therefore not be discussed in more detail herein.

The result of the motion estimation 305 and the optional motion prediction 310, i.e., the estimated vehicle state s(t), and the predicted future vehicle state s(t+T), is input to a force generation module 320 which determines the required global forces $V=[V_1, V_2]$ for the different vehicle units to cause the vehicle 100 to move according to the requested acceleration and curvature profiles $a_{req}$, $c_{req}$.

The required global force vector V is input to an MSD coordination function 330 which allocates tyre forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100.

The output of the MSD coordination function 330 may comprise classic torque requests $T_i$ and steering angle requests $\delta_i$ which can be sent to the different MSD controllers 230. The requests are sent over the interface 265 between the central controller and the one or more local MSD controllers. This interface may be based on a controller area network (CAN) bus or on some other network technology, such as an Ethernet link. A problem in many heavy-duty vehicle architectures is that the interface between the central controller and the local MSD controllers is of limited bandwidth, and may incur significant delay of the requests sent over the interface. This means that the response time of the vehicle actuators to a change in operating conditions, such as an abrupt reduction in road friction, may not be fast enough to successfully compensate for the change in operating condition.

Longitudinal wheel slip $\lambda_x$ may, in accordance with SAE J670 SAE Vehicle Dynamics Standards Committee Jan. 24, 2008, be defined as $$\lambda_x = \frac{R\omega_x - v_x}{\max(|R\omega_x|, |v_x|)}$$

where R is an effective wheel radius in meters, $\omega_x$ is the angular velocity of the wheel, and $v_x$ is the longitudinal speed of the wheel in the coordinate system of the wheel. Thus, $\lambda_x$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

In order for a wheel or tyre to produce a tyre force, slip must occur. For smaller slip values the relationship between slip and generated force are approximately linear, where the proportionality constant is often denoted as the slip stiffness of the tyre. The normal force $F_z$ acting on the tyre of a wheel 210 is key to determining some important vehicle properties. For instance, the normal force to a large extent determines the achievable lateral tyre force $F_y$ by the wheel since, normally, $F_x \leq \mu F_z$, where $\mu$ is a friction coefficient associated with a current road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

Herein, an inverse tyre model is a model of wheel behavior which describes tyre force generated in longitudinal direction in the rolling direction and/or lateral direction orthogonal to the longitudinal direction as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

Figure 4:
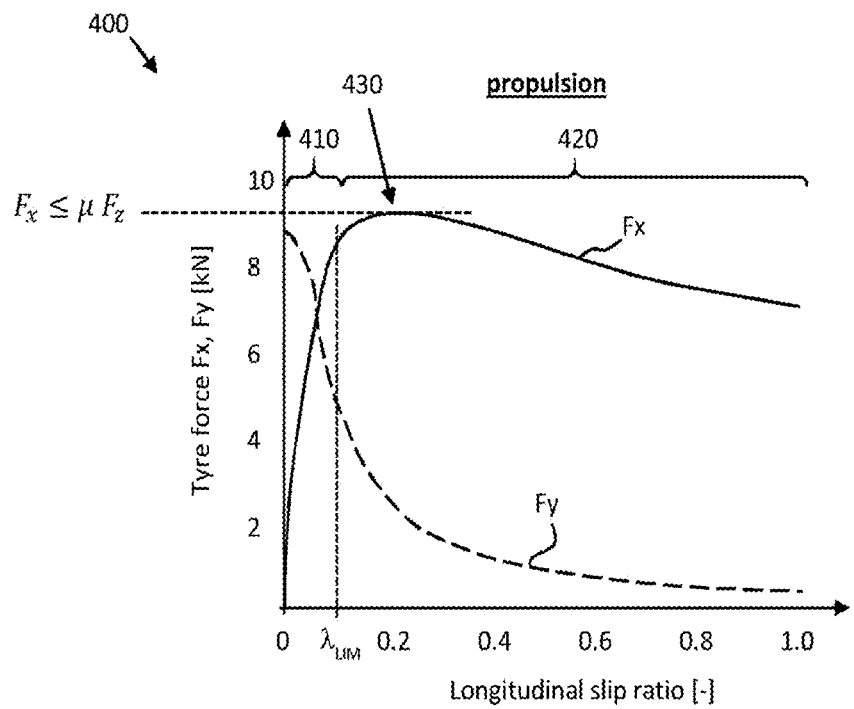
FIGS. 4-6 schematically illustrate example inverse tyre models.

FIG. 4 is a graph showing an example of achievable tyre force as function of wheel slip $\lambda$, i.e., an example inverse tyre model, where it is noted that the tyre force numerical values on the axle are just example values and not to be interpreted as limiting the present disclosure. The longitudinal tyre force Fx shows an almost linearly increasing part 410 for small wheel slips, followed by a part 420 with more non-linear behaviour for larger wheel slips. It is noted that there is a peak 430, beyond which the tyre force declines with wheel slip, i.e., if the wheel speed is increased beyond a given wheel speed, the generated tyre force will decline. The obtainable lateral tyre force Fy decreases rapidly even at relatively small longitudinal wheel slips. It is desirable to maintain vehicle operation in the linear region 410, where the obtainable longitudinal force in response to an applied brake command is easier to predict, and where enough lateral tyre force can be generated if needed. For larger wheel slips, e.g., exceeding 0.1, a more non-linear region 420 is seen. Control of a vehicle in this region may be difficult and is therefore often avoided. It may be interesting for traction in off-road conditions and the like where a larger slip limit for traction control might be preferred, but not for on-road operation. To ensure operation in this region, a wheel slip limit $\lambda_{LIM}$ on the order of, e.g., 0.1, can be imposed on a given wheel. However, this requires the vehicle speed over ground to be known with sufficient reliability and accuracy, and the configuration of the wheel slip limit value also requires some rudimentary information about the inverse tyre model given the current operating conditions of the wheel 210, i.e., the road friction conditions, the normal load, and the characteristics of the interaction between the tyre thread and the road surface.

The classic torque control loops of a heavy duty vehicle are, as discussed above, normally associated with time constants on the order of 10 ms or so, which may not be fast enough to react to changes in, e.g., road friction and the like. To improve vehicle motion management, an inverse tyre model can be used by the VMM 260 to instead generate a desired tyre force at some wheel. Then, instead of requesting a torque corresponding to the desired tyre force, the VMM can translate the desired tyre force into an equivalent wheel slip or, equivalently, a wheel speed relative to a speed over ground and request this slip instead. The main advantage being that the MSD control device 230 will be able to deliver the requested torque with much higher bandwidth by maintaining operation at the desired wheel slip, using the vehicle speed $v_x$ and the wheel rotational velocity $\omega_x$. The reason being that the control loop is now local, on the MSD side of the interface 265, which avoids the delay 340 on the interface between the central VMM controller and the local MSD controller. These concepts were discussed in WO2021144010A1. This approach of course requires that the inverse tyre model is at least approximately known, and also that reasonably accurate data on vehicle speed $v_x$ and wheel rotational velocity $\omega_x$ are available at the central VMM control unit 260. As noted in the introductory section of this disclosure, this may not always be the case.

Figure 5:
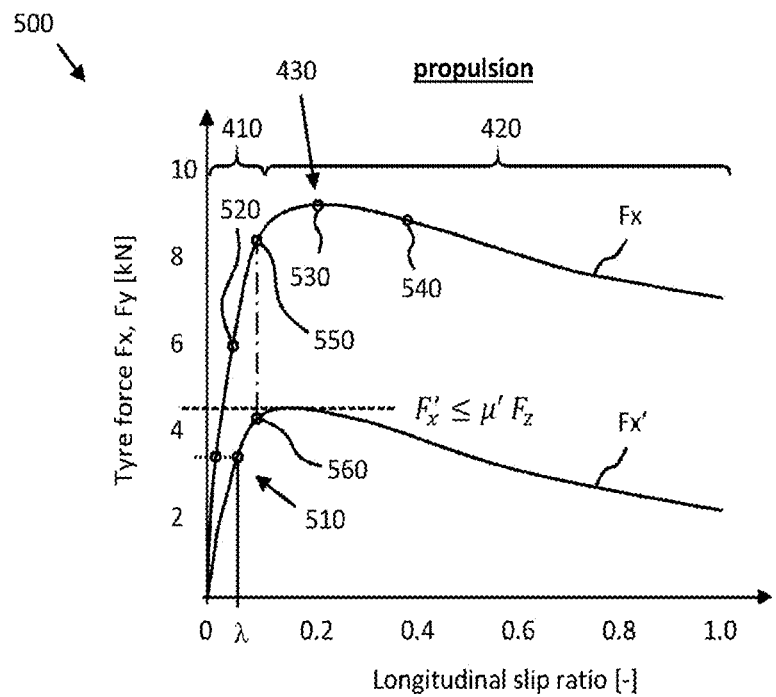

With reference to the example 500 in FIG. 5, suppose now that the inverse tyre model is Fx, and that a vehicle 100 is being accelerated (the wheel force request is positive). A tyre force of about 6 kN is initially configured 520, which corresponds to a wheel slip of about 0.05. Further acceleration is then desired, and the tyre force is increased up to about 9 kN 530. This corresponds to the peak obtainable tyre force in this example. In case the VMM control unit 260 requests a further increase in tyre force, say up to the operating point 540, then the tyre will enter into the non-linear region 420, and the increase in wheel speed will result in a decrease in generated tyre force, which is undesired in most situations. Notably, this decrease in generated tyre force will also be seen as a decrease in generated torque on the wheel axle, as long as the wheel speed is kept constant at least in relation to the slowly changing vehicle speed.

FIG. 5 also illustrates what happens if the friction suddenly drops. In this case the inverse tyre model changes abruptly from Fx to Fx'. Suppose that the vehicle is being accelerated and that a given tyre force is desired. To maintain this tyre force after the change in operating conditions, an increase in wheel slip is necessary 510. However, an MSD actuator such as an electric machine operating at high control bandwidth and configured to maintain a target wheel speed will not spin out of control if the friction suddenly drops. To see this, consider the two operating points 550 and 560. When the friction drops, the operating point also drops, but since the vehicle speed changes relatively slowly due to the inertias involved and the wheel speed is maintained by the high bandwidth MSD actuator controller, there will be no transition into the non-linear region, as would have been the case if a torque target was instead controlled against by the high bandwidth MSD actuator controller.

The present disclosure avoids the need for both an inverse tyre model and accurate vehicle speed over ground, by instead estimating a torque $T_{EST}$ which is currently being applied by an MSD, and correlating changes in applied torque with changes in wheel or axle speed $\omega$, assuming that both the applied torque and the controlled wheel speed changes much faster than the vehicle speed over ground. If, during propulsion with a positive generated torque, an increase in wheel speed $\omega$ results in a decrease in estimated applied torque $T_{EST}$, then it can be inferred that the peak 430 on the (unknown) inverse tyre model has been passed, and that the nonlinear region to the right of the peak has been entered. When this happens, the controller immediately backs off and reduces the target wheel speed which is configured at the MSD. Note that the MSD actuator always controls the wheel to maintain a set wheel speed, regardless of if the torque request is negative or positive. Thus, even if the road surface conditions change rapidly, the wheel will not suddenly increase its wheel slip, as would be the case if a torque had been configured.

To summarize, there is disclosed herein a control unit 230 for controlling at least one torque generating MSD 220, 250 on a heavy-duty vehicle 100, such as an electric machine. The control unit 230 is arranged to receive a motion request $T_i$, such as a torque request or a tyre force request, indicative of a desired longitudinal tyre force $F_x$ to be generated by the torque generating MSD 220, 250. It is noted that this request can be generated without any knowledge of an inverse tyre model like those discussed above in connection to FIG. 4 and FIG. 5, nor any knowledge about the speed of the vehicle 100 over ground. Rather, in case the TSM function 270 desires to accelerate or brake the vehicle, then the motion request can be adapted accordingly.

The control unit 230 is also arranged to obtain an estimated applied torque $T_{EST}$ indicative of a current torque generated by the torque generating MSD 220, 250. For instance, in case the MSD 250 is an electric machine, then the estimated applied torque $T_{EST}$ can be determined at least in part based on a motor current associated with the electric machine, as will be discussed below. The estimated applied torque $T_{EST}$ may also be obtained from an actuator control unit which often implements an output port for supplying this information to its controller in electrical or digital format. Interestingly, in case the MSD 250 is a wheel hub electric machine comprising an integrated electronic control unit (ECU), then this ECU may be arranged to output a signal comprising the estimated applied torque $T_{EST}$. As mentioned above, the estimated applied torque $T_{EST}$ may also at least in part be obtained based on an output from a torque sensor, such as a mechanical strain-force sensor. Thus, the control unit receives or determines the torque which is currently being applied by the torque generating device. This torque may be either positive or negative. An electric machine may generate both positive and negative torque, while a friction brake is only capable of generating negative torque. Of course, to estimate the torque generated by a friction brake, a torque sensor is necessary, unless the applied torque can be inferred from an applied brake pressure, which is possible in some cases, although calibration is often a problem. Torque estimation and torque sensors will be discussed in more detail below.

The control unit 230 is furthermore arranged to determine a target wheel speed $\omega_i$ based on the motion request $T_i$ and on the estimated applied torque $T_{EST}$, e.g. based on a difference between the two, and to configure the torque generating MSD 220, 250 to maintain the target wheel speed $\omega_i$ at a configured level. The configured wheel speed will be maintained by the MSD actuator regardless of road friction conditions (and independently of vehicle speed). Thus, if a given wheel speed has been configured by, e.g., an electric machine, and the wheel then encounters a patch of ice, there will be no or very small change in wheel speed since the control of the MSD is based on a target speed to be maintained. This is a significant difference compared to if the MSD is configured to maintain a target torque, in which case the wheel encountering low friction may spin out of control and into the non-linear region 420. Changes in wheel speed are configured by the control unit 230 based on the difference between the motion request and the current estimate of applied torque. If the motion request calls for additional force to be generated, then the wheel speed will be increased in a controlled manner, i.e., by step-wise increases or a controlled continuous increase, while at the same time monitoring the estimated applied torque.

A key concept of the present disclosure is that the control unit 230 is arranged to execute a back-off procedure which comprises decreasing the target wheel speed $\omega_i$ immediately in case an increase in configured wheel speed $\omega_i$ resulted in a decrease of the estimated applied torque $T_{EST}$. If this happens, i.e., if an increase in wheel speed during generation of positive torque results in a decrease in the estimated torque, then this most likely means that the peak 430 has been passed, and that the non-linear region 420 has been entered, where the slope of the relationship between tyre force and wheel slip is negative. This is almost always undesired, and the wheel speed is therefore immediately backed off, e.g., by a predetermined amount. The estimated applied torque $T_{EST}$ and the change in wheel speed are assumed sufficiently time synchronized, or at least near time synchronized. The level of synchronization depends on the rate at which the vehicle changes its speed over ground, and also on any transient effects present in the estimated torque signal.

The vehicle state, i.e., its velocity and acceleration, takes time to change due to the significant mass of a heavy-duty vehicle. The applied torque and wheel speed, on the other hand, can be changed quite rapidly using modern actuators which are designed for high bandwidth operation. This means that the vehicle speed can be assumed as near-constant or piece-wise constant while performing the fast speed control on the wheel.

Figure 6:
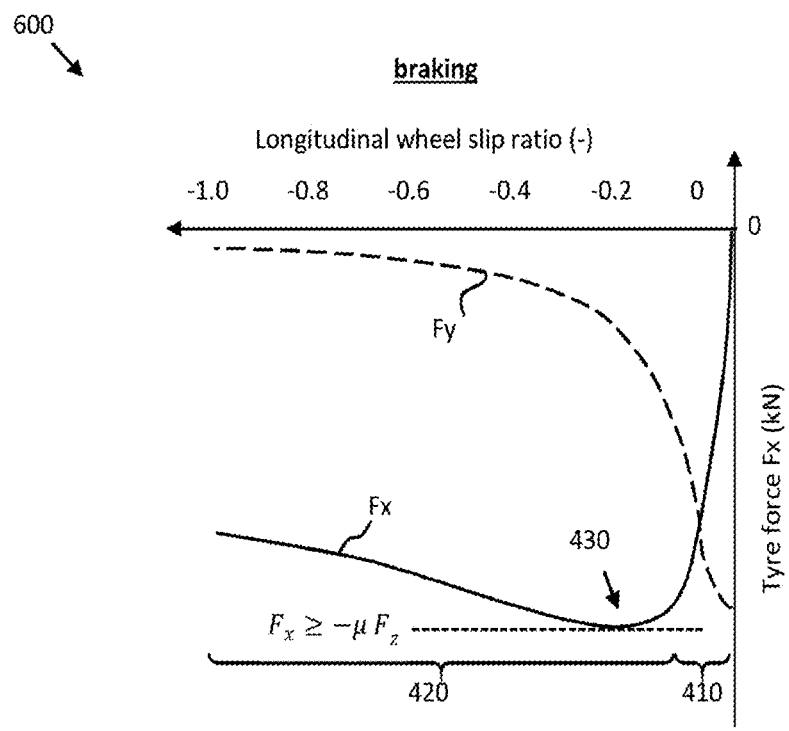

It is understood that the above concept can also be applied to braking, i.e., during generation of a negative torque by one or more torque generating MSDs. An example inverse tyre model 600 for negative applied torque is shown in FIG. 6, where it is noted that it is essentially a mirrored version of the inverse tyre model for propulsion, at least approximately. It also has a peak force 430, which separates a linear region 410 from a non-linear region. In this case, the control unit 230 receives a motion request $T_i$ indicative of a desired negative longitudinal tyre force $F_x$ to be generated by the torque generating MSD 220, 250, and immediately increases the target wheel speed $\omega_i$ (to the right on the 4 x-axis in FIG. 6) in case a decrease in configured wheel speed $\omega_i$ results in an increase in the estimated applied torque $T_{EST}$ (upwards on the y-axis in FIG. 6). I.e., if more braking results in less braking force.

Regarding the details of the torque estimation, it is noted that there are several methods known in the art for estimating an applied torque by an electric machine. Such methods are outside of the scope of the present disclosure and will therefore only be briefly discussed herein.

For instance, in case of a permanent magnet synchronous machine PMSM, the following relationship holds at least approximately in many cases $$T_{EST} = \frac{3p}{2}(\psi_m i_q + (L_d - L_q) i_d i_q)$$

where
p is the number of pole pairs of the PMSM,
$\psi_m$ is the flux linkage of the permanent magnet,
$L_d$ and $L_q$ are the d- and q-axis inductances of the PMSM, and
$i_d$ and $i_q$ are the d- and q-axis currents of the PMSM.

In "Accurate Torque Estimation for Induction Motors by Utilizing Globally Optimized Flux Observers," 2020 International Symposium on Power Electronics, Electrical Drives, Automation and Motion SPEEDAM, 2020, pp.

219-226, M. Stender, O. Wallscheid and J. Bocker discuss torque estimation for induction motors.

U.S. Pat. No. 8,080,956B2 provides an example of how applied torque can be estimated in practice.

Torque applied to an axle can of course also be measured by a mechanical or an electric torque sensor. A torque sensor, also known as a torque transducer or torquemeter, is a device for measuring and sometimes also recording the torque on a rotating system, such as a drive axle of a wheel 210. Static torque is relatively easy to measure. Dynamic torque, on the other hand, is not easy to measure since it generally requires transfer of some effect electric or magnetic from the shaft being measured to a static system. One way to achieve this is to condition the shaft or a member attached to the shaft with a series of permanent magnetic domains. The magnetic characteristics of these domains will vary according to the applied torque, and thus can be measured using non-contact sensors.

Commonly, torque sensors or torque transducers use strain gauges applied to a rotating shaft or axle. With this method, a means to power the strain gauge bridge is necessary, as well as a means to receive the signal from the rotating shaft. This can be accomplished using slip rings, wireless telemetry, or rotary transformers. Newer types of torque transducers add conditioning electronics and an A/D converter to the rotating shaft. Stator electronics then read the digital signals and convert those signals to a high-level analog output signal. Yet another way to measure torque is by way of twist angle measurement or phase shift measurement, whereby the angle of twist resulting from applied torque is measured by using two angular position sensors and measuring the phase angle between them.

Figure 11:
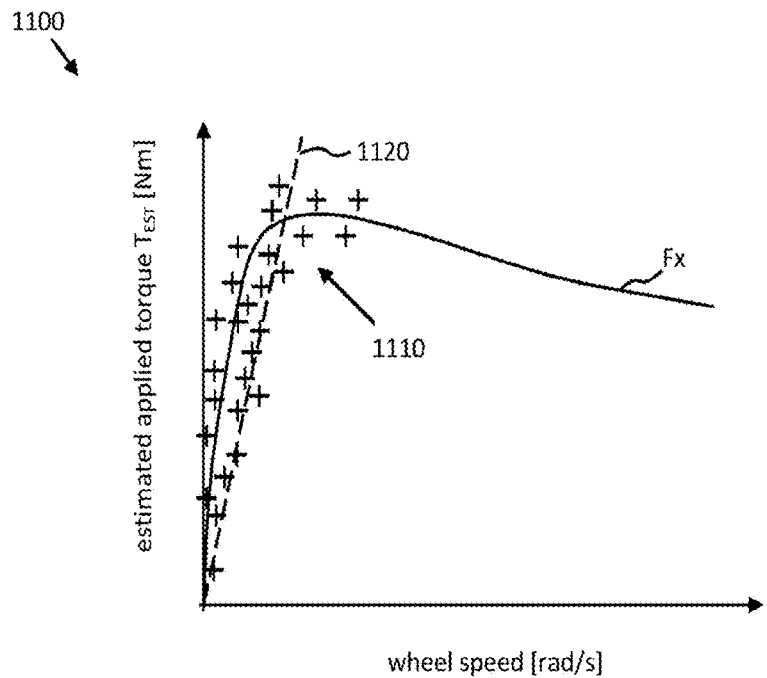
FIG. 11 shows an example model fit based on measurements.

The control unit 230 is optionally arranged to determine or at least approximate the relationship between the target wheel speed $\omega_i$ and the torque generated by the torque generating MSD 220, 250, based on a sequence of estimated applied torques ($T_{EST}$) and corresponding configured wheel speeds ($\omega_i$). In a simple realization, this relationship can be just a linear relationship between applied torque and wheel speed, which then carries information about the linear region 410 of the current inverse tyre model. Polynomial models or other more advanced models can also be used of course. Filtering can be applied to reduce measurement noise. The relationship can be estimated from pairs of wheel speed and estimated applied torque, e.g., by fitting a model curve such as a straight line, or by applying model-based filter, such as a Kalman filter, a particle filter, or the like, as shown in the example 1100 of FIG. 11, where the crosses 1110 represent measurement pairs of estimated torque and wheel speed, and where the dashed line 1120 represents the fitted model curve. This fitted model will of course only be valid for a given vehicle speed, but the VMM function 260, knowing the vehicle speed, may infer the true inverse tyre model from this type of feedback data. According to an example, the control unit 230 is arranged to output data indicative of the determined model as a capability signal 231, 232 to the VMM control unit 260. The VMM control unit 260 may have information related to the speed of the vehicle, and the radius of the wheel 210, and can therefore translate the model into an approximation of the current inverse tyre model.

The estimated applied torque $T_{EST}$ is preferably compensated for one or more predetermined wheel and/or driveline properties, such as an inertia value and/or a stiffness value. The estimated applied torque $T_{EST}$ can also be determined at least in part based on a predetermined electric machine wind-up characteristic. According to an example, the control unit 230 can be arranged to estimate a current generated tyre force $F_x$ as $$F_x = \frac{T_{motor} - J\omega_{motor} - f(\Delta\theta_{osc})}{R}$$

where $T_{motor}$ is a determined or estimated motor torque, $J_{\omega_{motor}}$ is a moment related to a motor inertia, $f(\Delta\theta_{osc})$ is a wind-up effect of the electric machine, and R is the radius of the wheel.

The methods discussed so far will avoid operation in the non-linear region by backing off as soon as it is determined that a change in wheel speed results in an undesired change in estimated applied torque. In the positive torque case (propulsion), the back-off is triggered if an increase in wheel speed results in a decrease in estimated applied torque. In the negative torque case (braking) the back-off is triggered if a decrease in wheel speed results in a decrease in applied torque.

Figure 7:
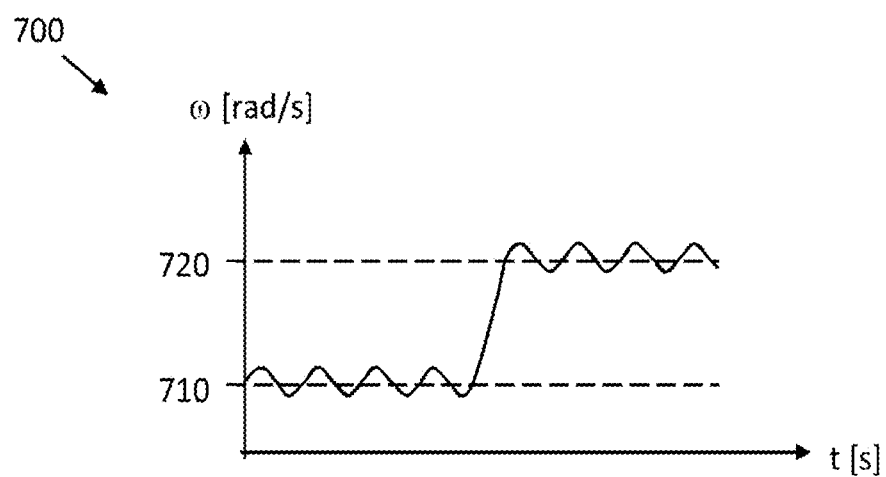
FIG. 7 is a graph showing an example wheel speed control strategy.

However, it has also be realized that the concept can be used to identify the peak of the current inverse tyre model, such as the peak 430 shown in FIG. 4. To do this, with reference to FIG. 7, the control unit 230 may be arranged to vary 700 the target wheel speed $\omega_i$ around a nominal target wheel speed value 710, 720 and to monitor the estimated applied torque $T_{EST}$ in dependence of the variation in target wheel speed. This allows the control unit to determine if the slope of the inverse tyre model is positive or negative around the nominal target wheel speed value 710, 720. The sign of the slope can be determined by the estimated applied torque $T_{EST}$, i.e., in the positive torque case, if a decrease in wheel speed results in decreased torque and an increase in wheel speed results in increased torque, then the slope is positive, while if a decrease in wheel speed results in an increase in torque, and an increase in wheel speed results in a decrease in applied torque, then the slope is negative and it is likely that the wheel 210 is operating in the non-linear region 420. The same mechanism can of course be used during braking, i.e., if the applied torque is negative. In this case operation past the peak force is indicated by a decrease in applied The methods disclosed herein can also be used to improve the feedback data 231, 232, 233 from the MSD control layer 230 to the VMM function 260. The control unit 230 may be arranged to set a current torque generating capability as the estimated applied torque $T_{EST}$ in case an increase in configured wheel speed $\omega_i$ results in a decrease in the estimated applied torque $T_{EST}$. I.e., if the back-off operation is triggered, then the currently estimated applied torque is most likely close to the maximum torque which can be generated by a given MSD. This value can then be communicated to the higher layers where it can be used as a capability in the MSD coordination.

When the back-off in wheel speed is triggered, it may also be advantageous to configure an increased control bandwidth by the actuator controller, in order to allow more rapid response to the events that are unfolding. A control bandwidth can often be configured at an actuator controller, allowing the MSD control function 230 to determine how fast the actuator should respond to its commands. This value is normally set as a tradeoff between actuator responsiveness and other objectives such as energy efficiency and passenger comfort. The control unit 230 can be arranged to increase this configured control bandwidth in case an increase in configured wheel speed of results in a decrease in the estimated applied torque $T_{EST}$.

Figure 8:
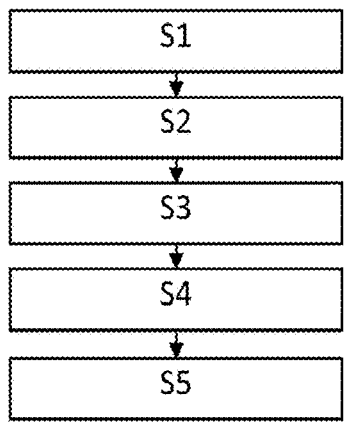
FIG. 8 is a flow chart illustrating a method.

FIG. 8 is a flow chart illustrating methods which summarize at least some of the discussions above. There is illustrated a computer implemented method performed in a control unit 230 for controlling at least one torque generating motion support device, MSD, 220, 250 on a heavy-duty vehicle 100, the method comprising:

receiving S1 a motion request $T_i$ indicative of a desired positive longitudinal tyre force $F_x$ to be generated by the torque generating MSD 220, 250, obtaining S2 an estimated applied torque $T_{EST}$ indicative of a current positive torque generated by the at least one torque generating MSD 220, 250, determining S3 a target wheel speed $\omega_i$ based on the motion request $T_i$ and on the estimated applied torque $T_{EST}$, and configuring S4 the torque generating MSD 220, 250 to maintain the target wheel speed $\omega_i$, the method further comprising executing S5 a back-off procedure comprising a decrease of the target wheel speed $\omega_i$ in case an increase in the configured wheel speed $\omega_i$ resulted in a corresponding decrease in the estimated applied torque $T_{EST}$.

Figure 9:
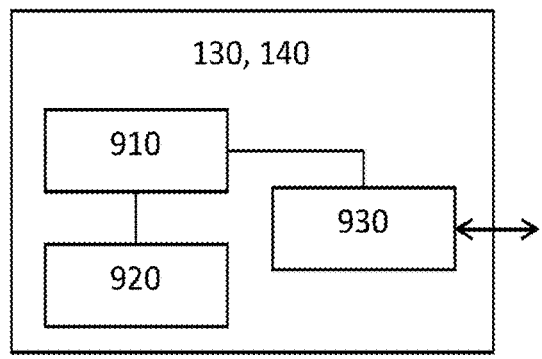
FIG. 9 schematically illustrates a control unit.

FIG. 9 schematically illustrates, in terms of a number of functional units, the components of a control unit such as the VUC 130, 140. The control unit may implement one or more of the above discussed functions of the TSM 270, VMM 260 and/or the MSD control function 230, according to embodiments of the discussions herein. The control unit is configured to execute at least some of the functions discussed above for control of a heavy-duty vehicle 100. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 920. The processing circuitry 910 may further be provided as at least one application specific integrated circuit ASIC, or field programmable gate array FPGA.

Particularly, the processing circuitry 910 is configured to cause the control unit 101 to perform a set of operations, or steps, such as the methods discussed in connection to FIG. 9. For example, the storage medium 920 may store the set of operations, and the processing circuitry 910 may be configured to retrieve the set of operations from the storage medium 920 to cause the control unit 1100 to perform the set of operations. The set of operations may be provided as a set of executable instructions. Thus, the processing circuitry 910 is thereby arranged to execute methods as herein disclosed.

The storage medium 920 may also comprise persistent storage, which, for example, can be any single one or combination of magnetic memory, optical memory, solid state memory or even remotely mounted memory.

The control unit 1100 may further comprise an interface 930 for communications with at least one external device. As such the interface 930 may comprise one or more transmitters and receivers, comprising analogue and digital components and a suitable number of ports for wireline or wireless communication.

The processing circuitry 910 controls the general operation of the control unit 1100, e.g., by sending data and control signals to the interface 930 and the storage medium 920, by receiving data and reports from the interface 930, and by retrieving data and instructions from the storage medium 920. Other components, as well as the related functionality, of the control node are omitted in order not to obscure the concepts presented herein.

Figure 10:
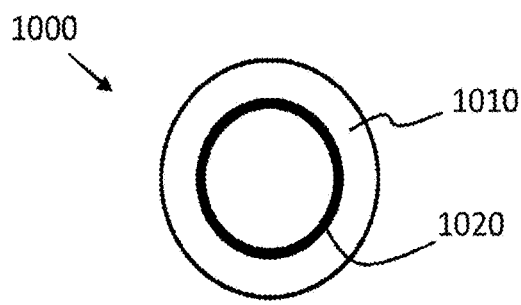
FIG. 10 shows an example computer program product.

FIG. 10 illustrates a computer readable medium 1010 carrying a computer program comprising program code means 1020 for performing the methods illustrated in FIG. 8, when said program product is run on a computer. The computer readable medium and the code means may together form a computer program product 1000.

The invention claimed is:

1. A control unit for controlling at least one torque generating motion support device ("MSD") on a heavy-duty vehicle,
   wherein the control unit is arranged to:
   receive a motion request indicative of a desired positive longitudinal tyre force to be generated by the torque generating MSD,
   obtain an estimated applied torque indicative of a current positive torque generated by the at least one torque generating MSD,
   determine a target wheel speed based on the motion request and on the estimated applied torque, and
   configure the torque generating MSD to maintain the target wheel speed,
   wherein the control unit is arranged to execute a back-off procedure comprising a decrease of the target wheel speed in case an increase in the configured wheel speed resulted in a corresponding decrease in the estimated applied torque.

2. The control unit according to claim 1, wherein the at least one MSD comprises an electric machine, wherein the estimated applied torque is at least in part based on a motor current associated with the electric machine.

3. The control unit according to claim 1, wherein the estimated applied torque is at least in part based on an output from a torque sensor.

4. The control unit according to claim 1, wherein the at least one MSD comprises a wheel hub electric machine comprising an integrated electronic control unit, ECU arranged to output a signal comprising the estimated applied torque.

5. The control unit according to claim 1, wherein the control unit is arranged to determine a relationship between the target wheel speed and the torque generated by the torque generating MSD based on a sequence of estimated applied torques and corresponding configured wheel speeds.

6. The control unit according to claim 5, wherein the control unit is arranged to output data indicative of the determined model as a capability signal.

7. The control unit according to claim 1, wherein the estimated applied torque is compensated by the control unit for one or more predetermined wheel and/or driveline properties.

8. The control unit according to claim 1, wherein the estimated applied torque is determined at least in part based on a predetermined electric machine wind-up characteristic.

9. The control unit according to claim 1, further arranged to estimate a current generated tyre force $F_x$ as $$F_x = \frac{T_{motor} - J_{\omega_{motor}} - f(\Delta\theta_{osc})}{R}$$

where $T_{motor}$ is a determined motor torque, $J_{\omega_{motor}}$ is a moment related to a motor inertia, and $f(\Delta\theta_{osc})$ is a wind-up effect of the electric machine.

10. The control unit according to claim 1, arranged to vary the target wheel speed around a nominal target wheel speed value and to monitor the estimated applied torque in dependence of the variation in target wheel speed.

11. The control unit according to claim 1, wherein the control unit is arranged to set a current torque generating capability as the estimated applied torque in case an increase in configured wheel speed results in a decrease in the estimated applied torque.

12. The control unit according to claim 1, wherein the control unit is arranged to increase a configured control bandwidth of an MSD actuator in case an increase in configured wheel speed results in a decrease in the estimated applied torque.

13. The control unit according to claim 1, wherein the control unit is arranged to:
receive a motion request indicative of a desired negative longitudinal tire force to be generated by the torque generating MSD,
wherein the control unit is arranged to increase the target wheel speed $w_i$ in case a decrease in configured wheel speed results in an increase in the estimated applied torque.

14. A vehicle comprising a control unit according to claim 1.

15. A computer implemented method performed in a control unit for controlling at least one torque generating motion support device ("MSD") on a heavy-duty vehicle, the method comprising
receiving a motion request indicative of a desired positive longitudinal tire force to be generated by the torque generating MSD,
obtaining an estimated applied torque indicative of a current positive torque generated by the at least one torque generating MSD,
determining a target wheel speed based on the motion request and on the estimated applied torque, and
configuring the torque generating MSD to maintain the target wheel speed,
the method further comprising executing a back-off procedure comprising a decrease of the target wheel speed $w_i$ in case an increase in the configured wheel speed resulted in a corresponding decrease in the estimated applied torque.

16. A computer program comprising program code for performing the steps of claim 15 when said program code is run on a computer or on processing circuitry of a control unit.

* * * * *